United States Patent
Sugiura

[11] Patent Number: 5,115,478
[45] Date of Patent: May 19, 1992

[54] IMAGE READER

[75] Inventor: Masamichi Sugiura, Toyokawa, Japan

[73] Assignee: Minolta Camera Kabushiki Kaisha, Osaka, Japan

[21] Appl. No.: 595,698

[22] Filed: Oct. 10, 1990

Related U.S. Application Data

[63] Continuation of Ser. No. 289,439, Dec. 23, 1988, abandoned, which is a continuation of Ser. No. 2,223, Jan. 12, 1987, abandoned.

[30] Foreign Application Priority Data

Jan. 10, 1986 [JP] Japan .................................. 61-4080
Feb. 5, 1986 [JP] Japan .................................. 61-24837

[51] Int. Cl.⁵ .............................................. G06K 9/38
[52] U.S. Cl. ........................................ 382/50; 235/436; 358/465; 358/466; 382/51; 382/53
[58] Field of Search .................... 355/8; 358/447, 449, 358/453, 462-466; 235/436, 466, 474, 495; 382/50-53, 61, 63, 65

[56] References Cited

U.S. PATENT DOCUMENTS

| 4,086,478 | 4/1978 | Okano | 235/466 |
|---|---|---|---|
| 4,357,596 | 11/1982 | Feilchenfeld | 235/436 |
| 4,384,272 | 5/1983 | Tanaka et al. | 382/50 |
| 4,420,742 | 12/1983 | Tadauchi et al. | 382/50 |
| 4,464,681 | 8/1984 | Jacobs et al. | |
| 4,471,386 | 9/1984 | Tuhro | 358/288 |
| 4,517,606 | 5/1985 | Yokomizo et al. | 382/50 |
| 4,602,291 | 7/1986 | Temes | 358/221 |
| 4,724,330 | 2/1988 | Tuhro | 250/578 |
| 4,728,984 | 3/1988 | Daniele | 355/8 |
| 4,751,376 | 6/1988 | Sugiura et al. | |

FOREIGN PATENT DOCUMENTS 58-172061 10/1983 Japan.
58-184160 10/1983 Japan.

Primary Examiner—David K. Moore
Assistant Examiner—Jose L. Couso
Attorney, Agent, or Firm—Burns, Doane, Swecker & Mathis

[57] ABSTRACT

A scan apparatus, comprising: a platen on which a document can be placed; a criterion member on which at least one black zone and at least one white zone are formed successively in the subscan direction, criterion member being arranged near the platen on the side from which a subscan is started; a device for detecting a linear optical image of the document to obtain the density distribution of the linear optical image; a device for scanning the criterion member and a document in the subscan direction which includes a device that illuminates a document placed on a document area of the platen and the criterion member; and a device for determining a reference timing for starting a scan of the document on the platen, which is connected to the device that detects a linear optical image so as to detect a boundary between the black and white regions and determine the reference timing from the boundary detected.

16 Claims, 8 Drawing Sheets

IMAGE READER

This application is a continuation of application Ser. No. 07/289,439, filed Dec. 23, 1988, which in turn, is a continuation of application Ser. No. 002,223 filed Jan. 12, 1987, now abandoned.

BACKGROUND OF THE INVENTION

1. Field of the Invention

The present invention relates to an image reader wherein a document is read with an image sensor.

2. Description of the Prior Art

In an image reader, a document which should be read by an image sensor is placed on a platen glass of an image reader and is covered with a document cover. The document is illuminated by a light source, and the density of a line on the document, that is, the light reflected from the line on the document is detected by a one-dimensional image sensor (main scan). The density is converted to digital data by an analog-to-digital converter, and after correcting the shading thereof, the digital data are binarized according to a predetermined processing. Then, the binarized data are stored in a memory. Then, the image sensor scans a next line of the document (subscan). By scanning all lines on the document, an image of the document is read out.

In a subscan of a document, the starting point of the subscan should be determined. For example, a switch is set at the top of a document region where a document may exist, and the starting point of the subscan is determined as the moment that the switch is switched on due to the movement of the optical system. In another method, a switch is set at a fixed point, and the starting point is determined according to a predetermined time interval which has past from the moment that the switch was closed. In those methods, however, the starting point can not be determined accurately unless the switch is mounted with a high precision.

In an image reader disclosed in Japanese Examined Patent Publication No. 28182/1985, two movable markers are set along an edge of the platen glass in the subscan direction at the starting point and at the end point of the subscan, respectively. The markers have a color of a predetermined reflection density. The start and the end of the reading are controlled by detecting images of the markers. However, this method requires a setting mechanism for the markers, and the positions of the markers should be controlled each time.

Another problem of an image reader is that the level of reading of an image has to be changed because the level of the output signals of pixels of an image sensor such as a charge-coupled device and the gain of the amplifier for the output signals of charge-couple device are varied according to the temperature in the image sensor.

It is desirable that the fluctuations of the level of reading are corrected over a whole range of density, especially in the reading of a half-tone image.

Especially, the fluctuations in the zero level of pixels of the image sensor cause the fluctuations in the black level of the output image so that the image is reproduced very badly.

In Japanese Patent Laid Open Publication No. 172061/1983, the analog signal of a white color is corrected in a correction range determined by a peak value of the analog signal of the white. In Japanese Patent Laid Open Publication No. 184160/1983, a predetermined level such as the middle value is obtained from the two standard patterns of white and black, and the electric power supplied to the light source is controlled according to the comparison of the level with a standard value. However, the black level is not corrected in those methods.

SUMMARY OF THE INVENTION

An object of the present invention is to provide a scan apparatus suitable for an image reader which can detect the top of a document region accurately, on which a document is placed.

Another object of the present invention is to provide an image reader which can correct the level of reading.

To this end, according to the present invention, there is provided a scan apparatus comprising: a platen on which a document can be placed a criterion member on which at least one black zone and at least one white zone are formed successively in the subscan direction, said criterion member being arranged near the platen on the side from which a subscan is started: means for detecting a linear optical image of the document to obtain the density distribution of the linear optical image: means for scanning the criterion member and a document in the subscan direction, said means including means for illuminating a document placed on a document area of the platen and the criterion member: and means for determining a reference timing for starting a subscan of the document on the platen, said means being connected to the means for detecting a linear optical image so as to detect a boundary between the black and white regions and determining the reference timing from the boundary detected.

According to the present invention, there is provided an image reader for reading an image of a document and giving digital data corresponding to the image having been read, comprising: a platen on which a document can be placed; a criterion member on which at least one black zone and at least one white zone are formed successively in a subscan direction, said criterion member being arranged near the platen on the side from which a subscan is started; means for detecting a linear optical image on a document to obtain the density distribution of the linear optical image; means for scanning the criterion member and a document in the subscan direction, said means including means for illuminating a document placed on a document area of the platen and the criterion member; means for converting analog signals received from the detecting means to digital data; and means for controlling said converting means upon processing digital data so as for them to have proper levels according to density signals with respect to the black and white zones of the criterion means detected by said detecting means.

An advantage of the present invention is that the top edge of a document region can be detected precisely by using a subscan of a black pattern formed on the criterion means so that the scan of a document can be started at the correct position constantly.

Another advantage of the present invention is that the output level of the image signal can be corrected according to both white and black density levels that have been detected.

DESCRIPTION OF PREFERRED EMBODIMENTS

Figure 1:
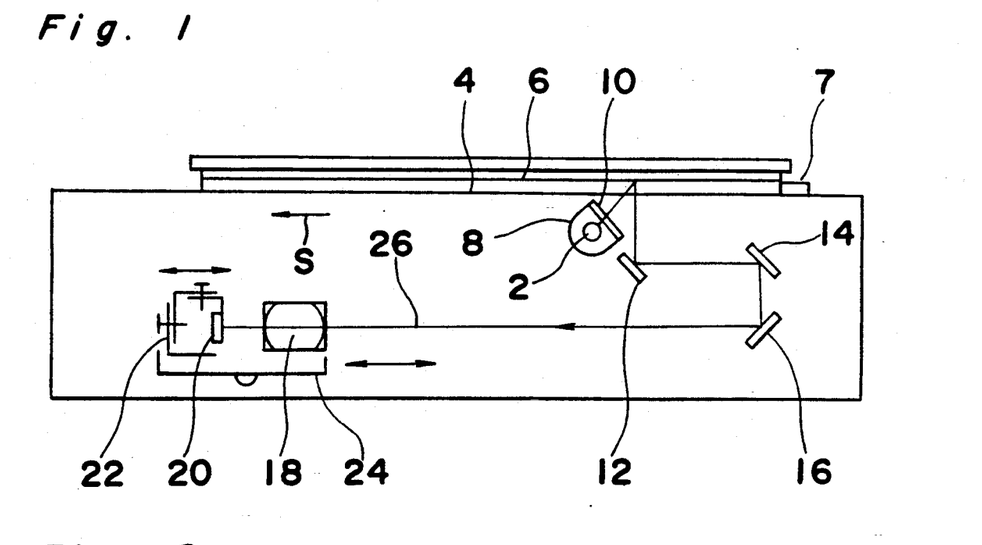
FIG. 1 is a schematic crosssection of an image reader.

Referring now to the drawings wherein like reference characters designate corresponding parts, an embodiment of an image reader according to the present invention will be explained in a following order:

a. image reader b. scan c. detection of the top edge of pattern d. detection of image area e. level control (a) Image reader FIG. 1 shows a schematical sectional view of an image reader. A light source for exposure illuminates a document 6 placed on a glass platen 4 along a plate for a document scale. A pattern plate 7 mounted on the rear plane of the document scale is arranged at the top edge of the platen 4. The light source consists of a halogen lamp 2, a concave mirror 8 and an infrared filter 10.

The light reflected from the document 6 is reflected successively in a scan system or a slider which comprises a first mirror 12, a second mirror 14 and a third mirror 16. Then, it is transmitted finally on a one-dimensional charge-coupled device (image sensor) 20 through an optical lens assembly 18.

The one-dimensional charge-coupled device (hereinafter referred to as CCD) 20 is held by a CCD holder 22. The CCD holder 22 and the lens assembly 18 are mounted on a carriage 24.

The reading magnification of an image of the document 6 can be varied continuously by moving the carriage 24 along the direction of the optical axis 26 of the lens 18 by using a motor (not shown).

The focusing can be controlled by moving CCD 20 along the direction of the optical axis 26 by using a motor (not shown) mounted to the carriage 24.

As is well known, on scanning the document 6, the light source 2,8,10 and the first mirror 12 are moved integrally in a direction of an arrow S at a velocity V, while the second and third mirrors 14, 16 are moved integrally in the direction of an arrow S at the velocity of ($\frac{1}{2}$)V, in order to keep the length of the optical path constant.

In this embodiment, a reduction optical system with CCD 20 is used, while a CCD of contact type may also be used.

Figure 2:
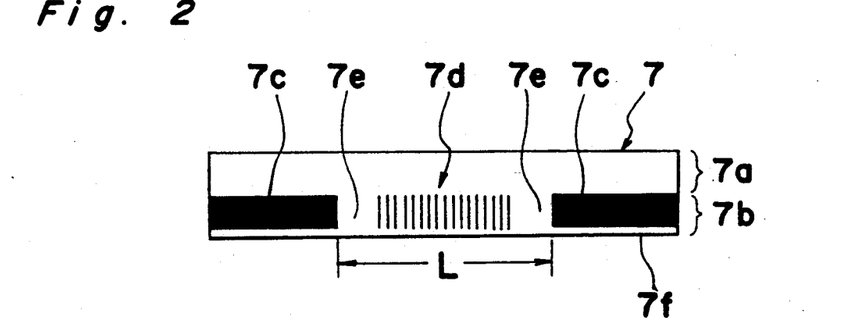
FIG. 2 is a plan view of a pattern plate.

FIG. 2 shows a pattern which is formed on the rear surface of the plate 7 for a document scale. The upper half 7a of the pattern is white and is used for the correction of the shading. At the center of the lower half 7b of the pattern a lattice pattern 7d for the control of focusing is drawn, while at the both sides thereof a pair of black patterns 7c is formed symmetrically with respect to the center. The distance L between the edges of the patterns 7c yields a standard distance for the setting of the magnification. The remaining part 7e is white. One of the black patterns 7c is used for the detection of the top of the plate 7 (or the top of the document area on the platen 4).

Figure 3:
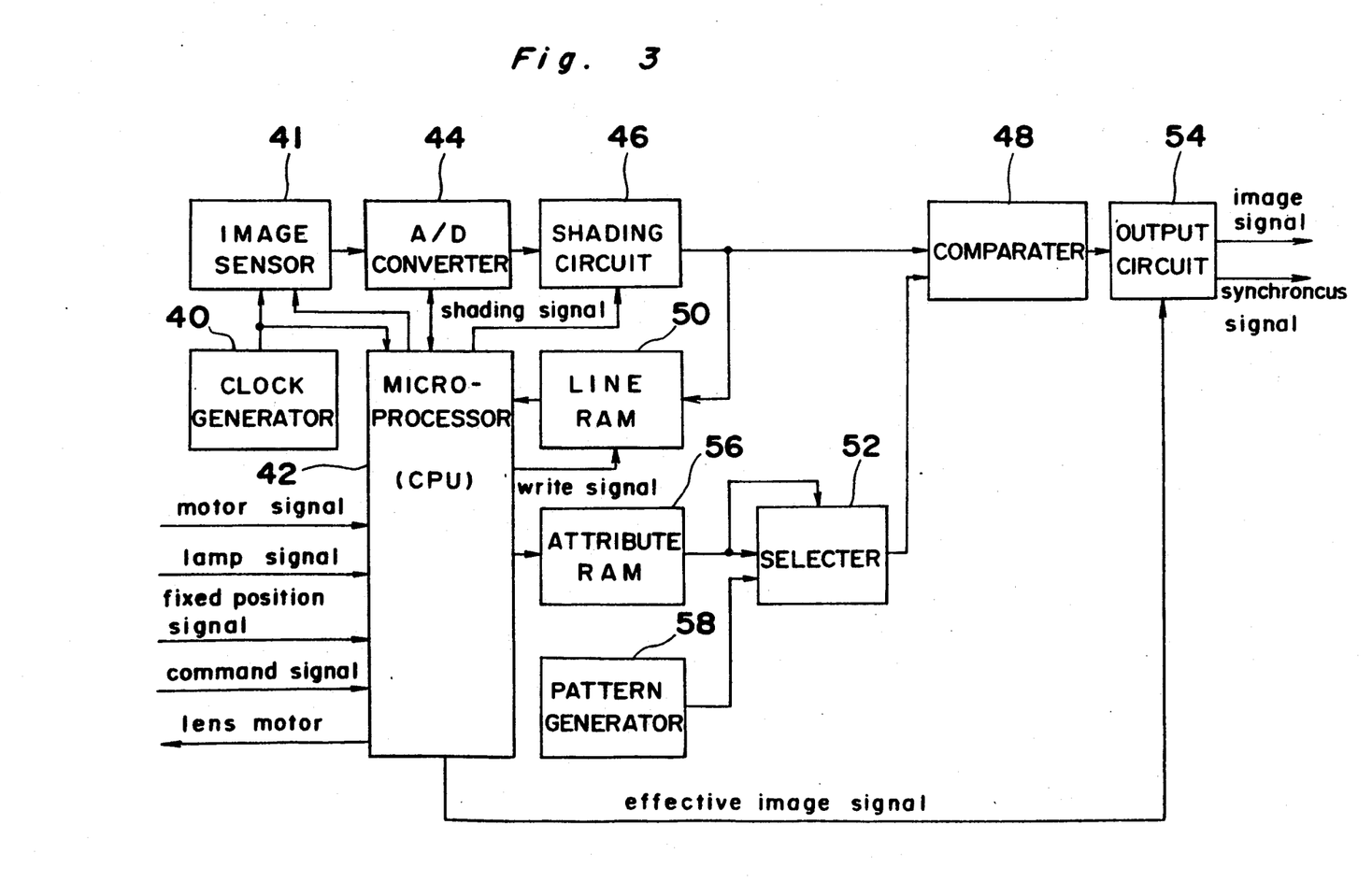
FIG. 3 is a block diagram of an electric circuit of an image reader.

FIG. 3 shows a block diagram of a circuit which can detect the density distribution of an image on a document. A clock generator 40 gives clock signals to a microprocessor (CPU) 42 and sample-hold (SH) signals to an image sensor 41 which has a CCD 20 for transforming light signals of the image into electric signals, and the output level of CCD 20 is controlled by a signal from CPU 42. An analog-to-digital (A/D) converter 44 transforms the analog output signals of the image sensor 41 into digital signal data, and the conversion level thereof is controlled by a signal from CPU 42. A shading circuit 46 corrects the variation of the intensity of light in the direction of the main scan as well as the scattering of the characteristics of the elements (pixels) of CCD 20, and the timing of the correction is given by CPU 42. The output signal of the shading circuit 46 is sent to a comparator 48 and a line RAM 50. CCD 20 consists of, for example, 2048 elements. They are aligned linearly in the direction perpendicular to that of the main scan so that the light from a long but narrow line of an image can be received and can be integrated in the elements at the same time during a period determined by SH signals. In the next period, the charges in the elements are transferred to registers in parallel and they are read out successively (this process is called main scan). The data thus scanned are stored in the line RAM 50. In the same period, the scan system moves by one line in the direction perpendicular to that of the main scan (this process is called subscan), and the light is newly integrated in the elements. This procedure is repeated successively from the top to the bottom of the area of the platen 4.

The comparator 48 compares the image signal corrected by the shading circuit 46 with the signal selected by a selecter 52, and the resultant 1-bit output signal is sent to an output circuit 54. The output circuit 54 sends both 1-bit image signal and effective image signal (synchonizing signal) received from CPU 42 to an external apparatus such as a printer.

A line RAM 50 stores the signals of one main scan corrected by the shading circuit 46 according to a write signal received from CPU 42. CPU 42 gets the image data of one scan with access to the line RAM 50. Attributes stored in an attribute RAM 56 includes an attribute of bi-level or dither which has been determined by CPU 42 from the data written in the line RAM 50 (refer FIG. 6). The attribute data are used by a selector 52 at the transfer (or main scan) of the image signal in a main scan.

A pattern generator 58 generates a threshold value when the attribute is dither, and the threshold value is generated from a matrix (m×n). The selector 52 selects a threshold data from both attribute data and threshold data and sends it to the comparator 48. That is, when the attribute is dither, the selector 52 sends the data received from the pattern generator 58 to the comparator 48, while when the attribute is bi-level, it sends a threshold data received from the attribute RAM 56. CPU 42 controls all the circuits based on the above-mentioned signals, the motor signal, the lamp signal and the fixed position signal.

On reading an image on a document, the output level of the image signal and the shading are corrected before a scan of a document.

As to the correction of the output level of the image signal, the structures of the image sensor 41 and the A/D converter 44 are explained.

Figure 4:
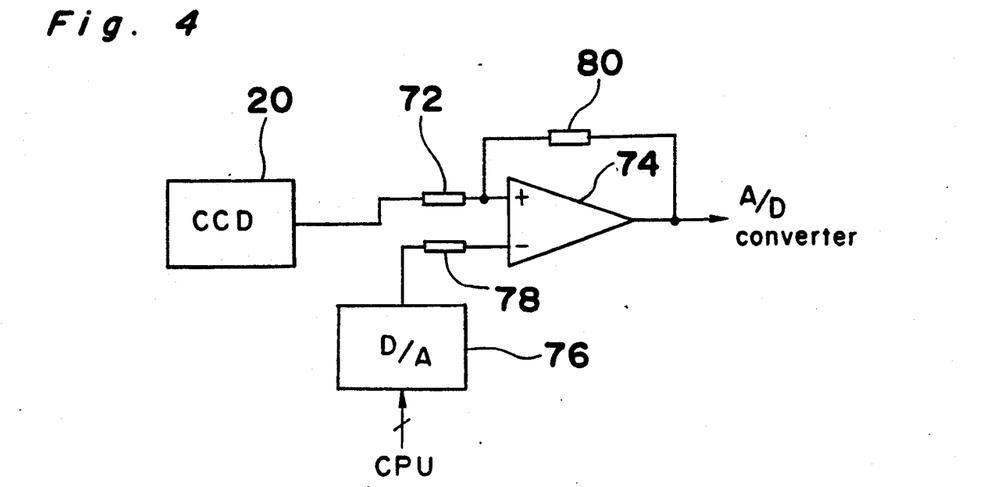
FIG. 4 is a block diagram of an image sensor.

FIG. 4 shows a block diagram of the image sensor 41. The output terminal of a one-dimensional charge-coupled device (CCD) 20 is connected via a resistor 72 to the + input terminal of an operational amplifier 74. On the other hand, a digital-to-analog converter (D/A) 76 converts a digital signal for the control of the zero point received from CPU 42 to an analog value, which is sent via a resistor 78 to the − input terminal of the operational amplifier 74. The + input terminal and the output terminal of the operational amplifier 74 are connected via a resistor 80 to each other. Thus, the operational amplifier 74 amplifies the difference between the output voltage of CCD 20 and a voltage for the control of the zero level, and sends the output voltage to the A/D converter 44. Therefore, the black level can be detected precisely if the signal for the control of the zero level received from CPU 42 is controlled so as to cancel the offset signal of the operational amplifier 74.

Figure 5:
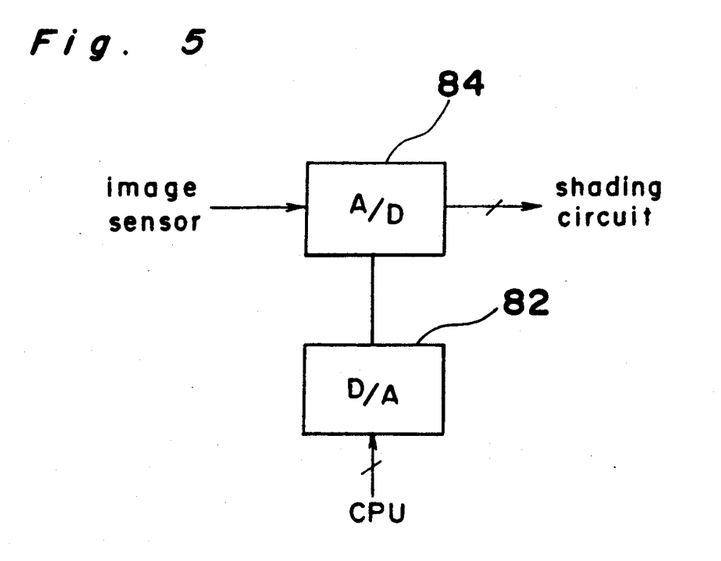
FIG. 5 is a block diagram of an A/D converter.

FIG. 5 shows a block diagram of the A/D converter 44. The standard voltage which gives the conversion factor of the analog-to-digital conversion is given to an analog-to-digital conversion part 84 by a digital-to-analog conversion part 82, which converts a digital signal received from CPU 42 to an analog value of the standard voltage. The analog-to-digital conversion part 84 converts an analog voltage received from the image sensor 20 to a digital value by using the standard voltage, which digital value is sent to the shading circuit 46. The signal received from the image sensor 20 is controlled as to the zero level as explained above. Therefore, the maximum value (the white level) of the analog-to-digital conversion can be controlled by controlling the signal which CPU 42 sends to the digital-to-analog conversion part 82.

(b) Scan

Figure 6:
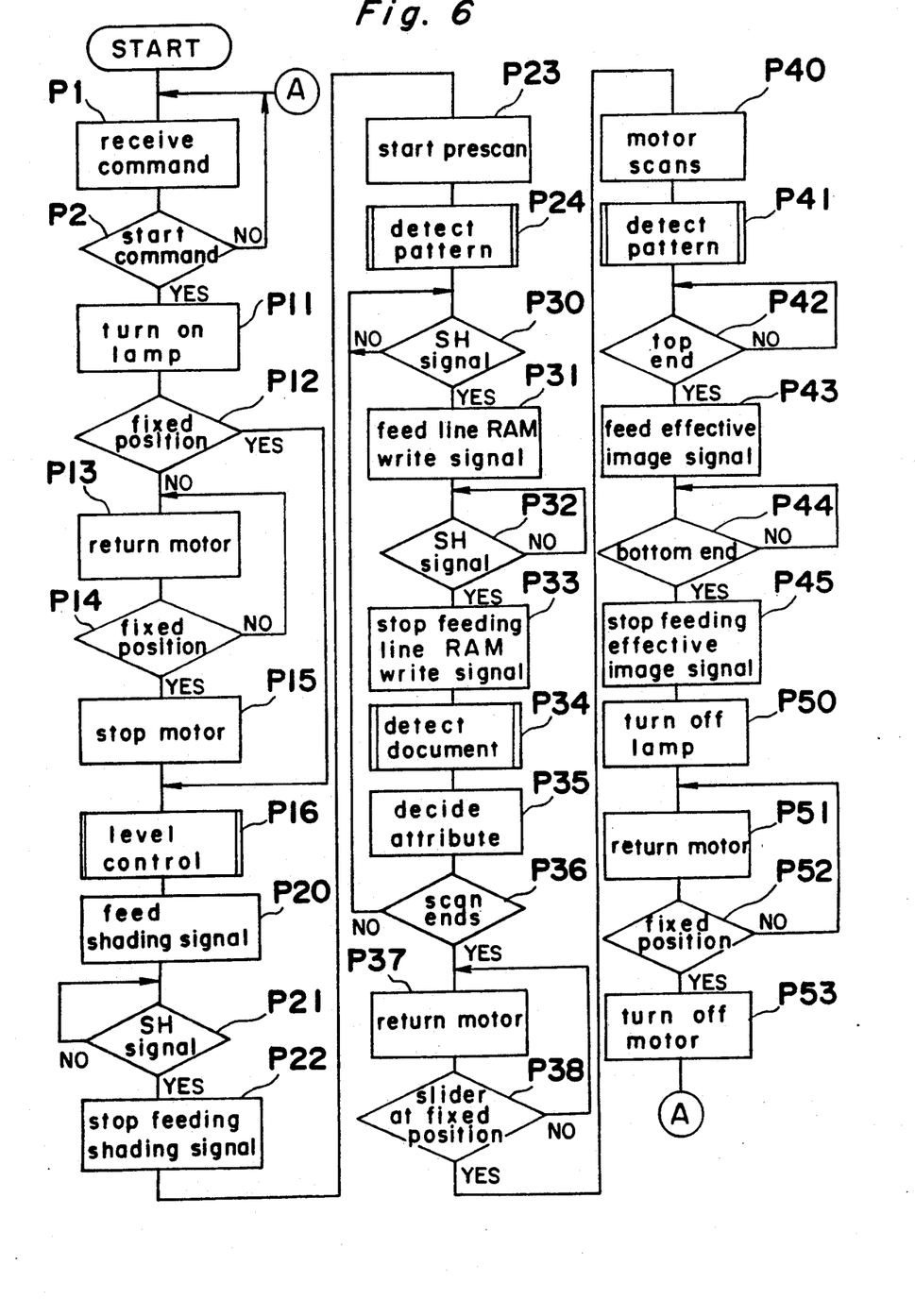
FIG. 6 is a flowchart of reading a document.

FIG. 6 shows a flowchart of scan. If the start command is received (steps P1, P2), a following scan action starts, wherein the magnifying power and other parameters of the scan system have been set according to operating conditions.

Then, the exposure lamp 2 is turned on (step P11). Next, it is decided whether the scan system (slider) returns at a predetermined fixed position or not (step P12). If the decision is yes, the program goes to step P16. If not, the scan motor is driven so that the scan system is moved in the return direction to the fixed position (step P13) until the scan system locates at the fixed position (step P14). Then, the scan motor is stopped (step P15).

Then, the level of CCD 20 is controlled (step 16), as will be explained later in detail.

Next, the shading process starts. Because the slider locates at the fixed position, the shading signal is fed (step P20). After a sample-hold (SH) signal as the synchronizing signal of the output of the image sensor 20 is received (step P21), the shading signal is stopped (step P22), and a prescan for the detection of a document and for the decision of the attribute starts (step P23).

Then, the top edge of the pattern of the plate 7 is detected (step P24), as will be explained later.

After an SH signal is received (step P30), the output voltage of the image sensor 41 corrected for the shading are written in the line RAM 50 (step P31). Next, After an SH signal is received (step P32), the write signal to the line RAM 50 is stopped (step P33), and a document is detected from the data written in the line RAM 50 (step P34). Next, it is decided whether the attribute of the data processing is bi-level or dither from the data written in the line RAM 50, and the results of the decision are written in the selecter 52 (step P35), as will be explained later in detail. Then it is decided whether the scan ends or not (step P36). If the decision is yes, the motor is driven in the return direction (step P37) until the slider returns to the fixed position (step P38).

Then, a normal scan starts. First the scan motor is driven in the direction of subscan by a predetermined step, and a scan for the output of the data starts (step P40). The top edge of the pattern of the plate 7 is determined (step P41), as will be explained later. The margin at the upper side of the paper has been calculated from the size of the detected image on the document, the size of the paper and the magnifying factor so that the document area locates just at the center of the paper. The calculated value of the margin or the position of the upper end of the image on the document is used for example for the generation of the subscan synchronizing signal for the feed of a paper in the printer as an output apparatus. The subscan synchronizing signal is sent after the delay of a calculated period according to the margin after the start of the scan of step P40. Next, the scan of the scan motor proceeds until it reaches the top position of the image which has been determined at the prescan (step P42) Then, the output circuit 54 is made effective (step P43). After this, the read-out of the image proceeds successively until it is decided that the scan comes to the bottom position of the image area in the document (step P44).

Then, the output signal of the output circuit 54 is stopped (step P45), and the exposure lamp 2 is turned off (step P50). The scan motor is returned (step P51) until the slider reaches the fixed position (step P52), and the motor is also turned off (step P53). After this, the flow returns to step P1 of the main routine, and the next start command is waited.

(c) Detection of the top edge of the pattern

Figure 7:
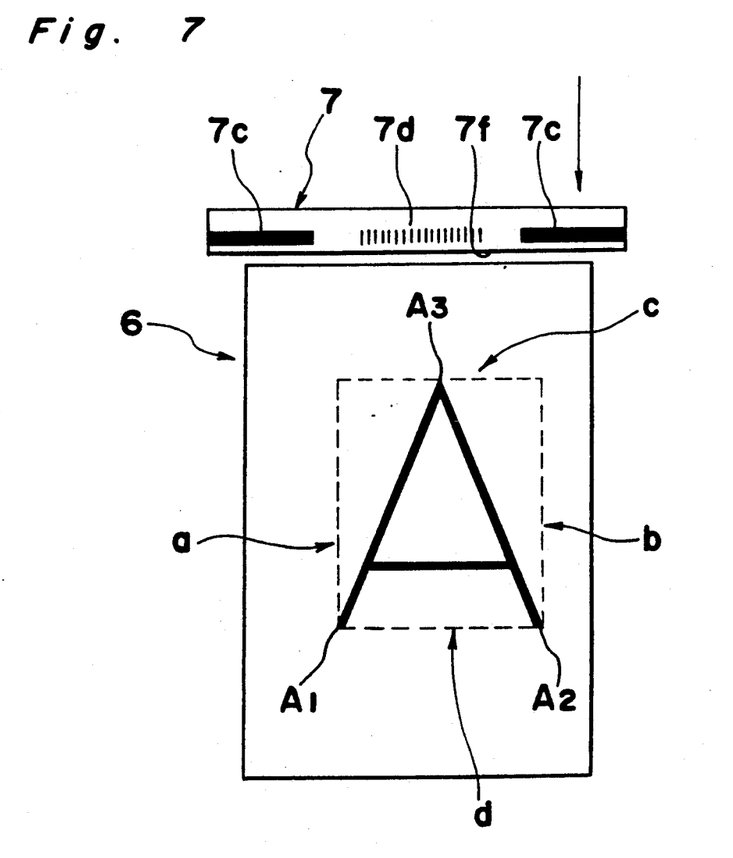
FIG. 7 is a diagram which shows the detection of the top edge of a document area and an image area on a document.

The top edge 7f of the plate is detected by using a black pattern 7c drawn on the rear surface of the plate 7, as shown in FIG. 7. The rear surface of the plate 7 is scanned in the subscan direction shown by an arrow in FIG. 7. The point where the output signal of CCD 20 changes from black to white after it changes from black to white on the scan across the black pattern 7c is determined as the boundary of the black pattern 7c at the side of the document 6. Then, the top edge 7f of the plate 7 or the top edge of the document area is determined by adding a known distance between the boundary and the edge 7f to the boundary position. Therefore, the scan of the document area will start from the edge 7f. In order to detect the change of the level of the density from white to white via black, the both sides of the black pattern 7c are made white.

Figure 8:
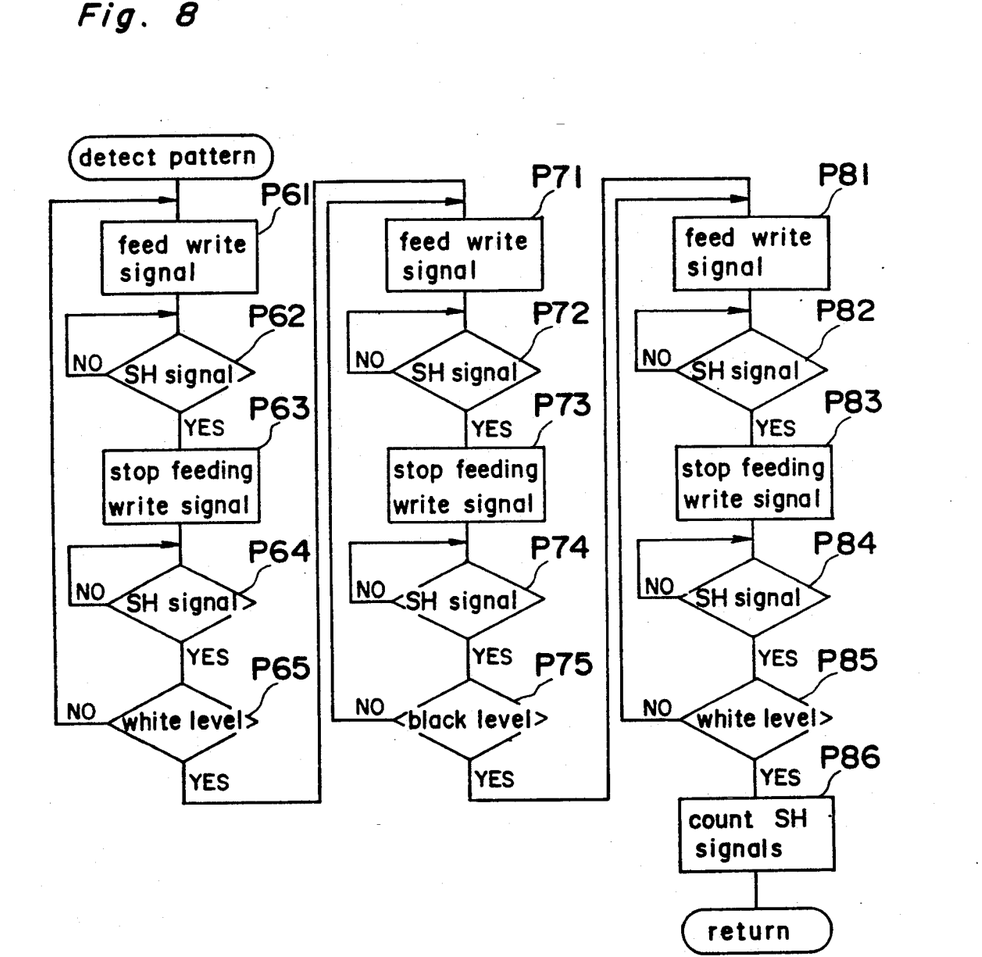
FIG. 8 is a flowchart of the detection of a pattern.

FIG. 8 shows a flow of the detection of the top edge of the plate 7. After the start of the prescan (step P23 in FIG. 6), the output signal of one or more pixels in the one-dimensional CCD 20 which locates in a position favorable to the detection of the black pattern 7c is detected by CPU 42 every time an SH signal is received from the clock generator 40. The shading has already been corrected (steps P20–P22).

First, the line RAM write signal is fed again (step P61), and the output signal of CCD 20 is written in line RAM 50. After an SH signal is received from the clock generator 40 (step P62), the line RAM write signal is stopped (step P63), and a next SH signal is waited for (step P64). Subsequent to the next SH signal the level of the pixel is read, and it is decided whether the level is the white level or not (step P65). This process is repeated until the white level is detected. If the white level is detected, it is decided that CCD 20 locates in the white part 7a. The line RAM write signal is fed (step P71), and the output signal is written in line RAM 50. After an SH signal is received from CCD 20 (step P72), the line RAM write signal is stopped (step P73), and a next SH signal is waited for (step P74). Subsequent to the next SH signal, the level of the pixel at the predetermined position in CCD 20 is read, and it is decided whether the level is the black level or not (step P75). This process is repeated till the black level is detected. If the black level is detected, it is decided that CCD 24 is located at the black pattern 7c.

Next, the line RAM write signal is fed again (step P81), and the output signal is written in line RAM 50. After an SH signal is received from CCD 20 (step P82), the line RAM write signal is stopped (step P83), and a next SH signal is waited for (step P84). Then the level of the pixel is read, and it is decided whether the level is the white level or not (step P85). This process is repeated until the white level is detected. If the white level is detected, it is decided that CCD 20 locates in the white part between the black part 7b and the edge 7f. In other words, the top edge of the black pattern 7c at the side of the document 6 is detected.

Then, a predetermined number of SH signals are counted (step P86) or a predetermined length is passed, and the top edge 7f of the plate 7 is found.

(d) Detection of document

An image area which contains information such as characters and figures in a document is detected in this embodiment (step P34 in FIG. 6). Thus, even if a document is not placed in a regular area on the platen glass 4, the whole document can be read. The location of the edge of a document is detected as the point where the density changes from the white level to the black level.

The detection method which will be explained in the following makes it possible to detect a document correctly even when a document cover is open so that the surrounding area of the document is detected as a black frame.

The detection will be explained with reference to an example shown in FIG. 7, where a large Roman character "A" is drawn on a document 6. In this embodiment, an image area is detected as the narrowest rectangle which encircles the information, that is, "A", as shown by dashed lines a-d in a document 6. The dashed line (left edge) a and the dashed line (right edge) b perpendicular to the main scan direction make contact with the furthest left point $A_1$ of the character A and with the furthest right point $A_2$ thereof, respectively. The dashed line (top edge) c and the dashed line (bottom edge) d parallel to the main scan direction make contact with the highest point $A_3$ of the character A and the lowest points $A_1$ and $A_2$ thereof, respectively. The boundaries a,b,c and d of the image area are parallel or perpendicular to the main scan direction because a document 6 is detected linearly in the main scan direction by CCD 20. An image area is detected by CCD 20 by moving the scan position of CCD 20 successively from the top edge 7f to the bottom of the document area in the subscan direction.

Figure 9A:
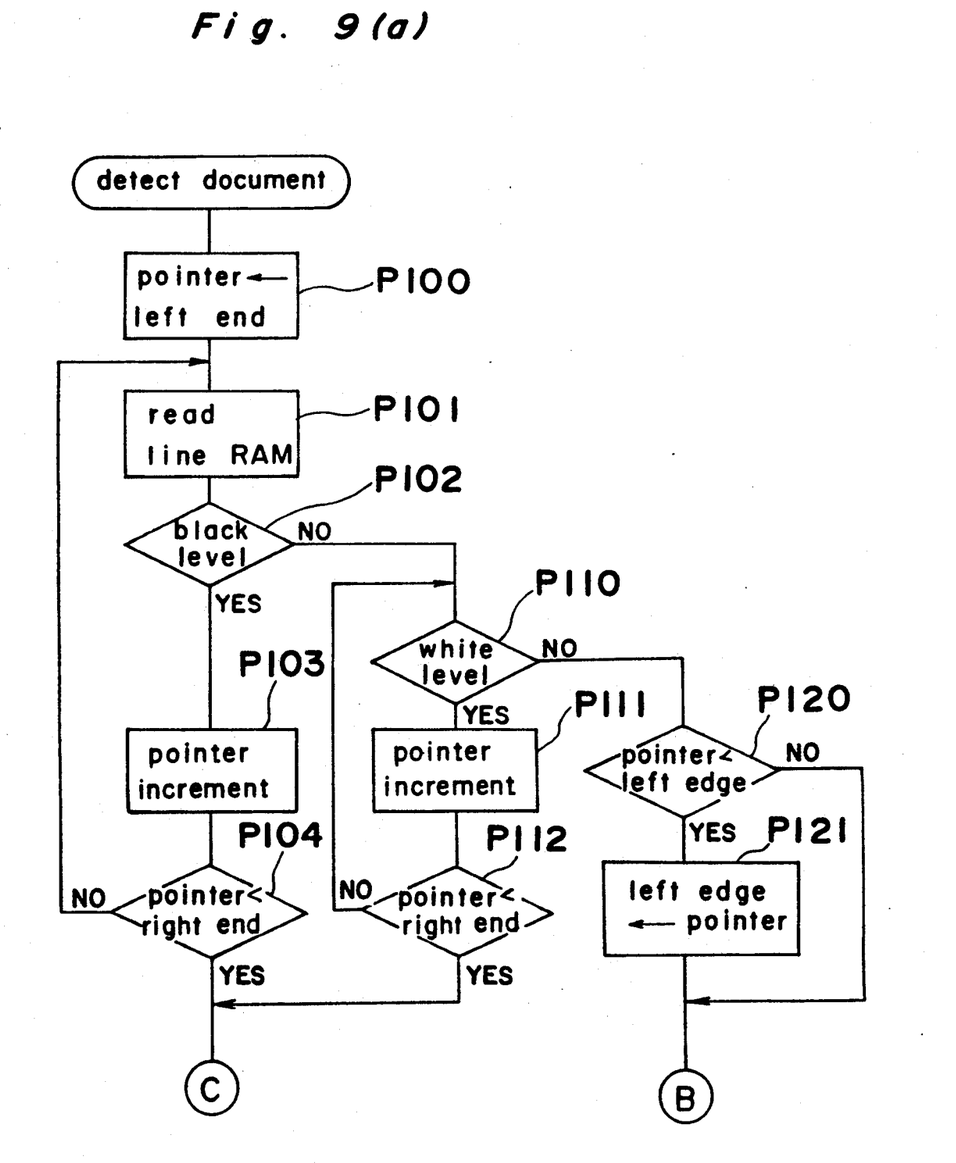
FIGS. 9(a), (b) are flowcharts of the detection of a document.
Figure 9B:
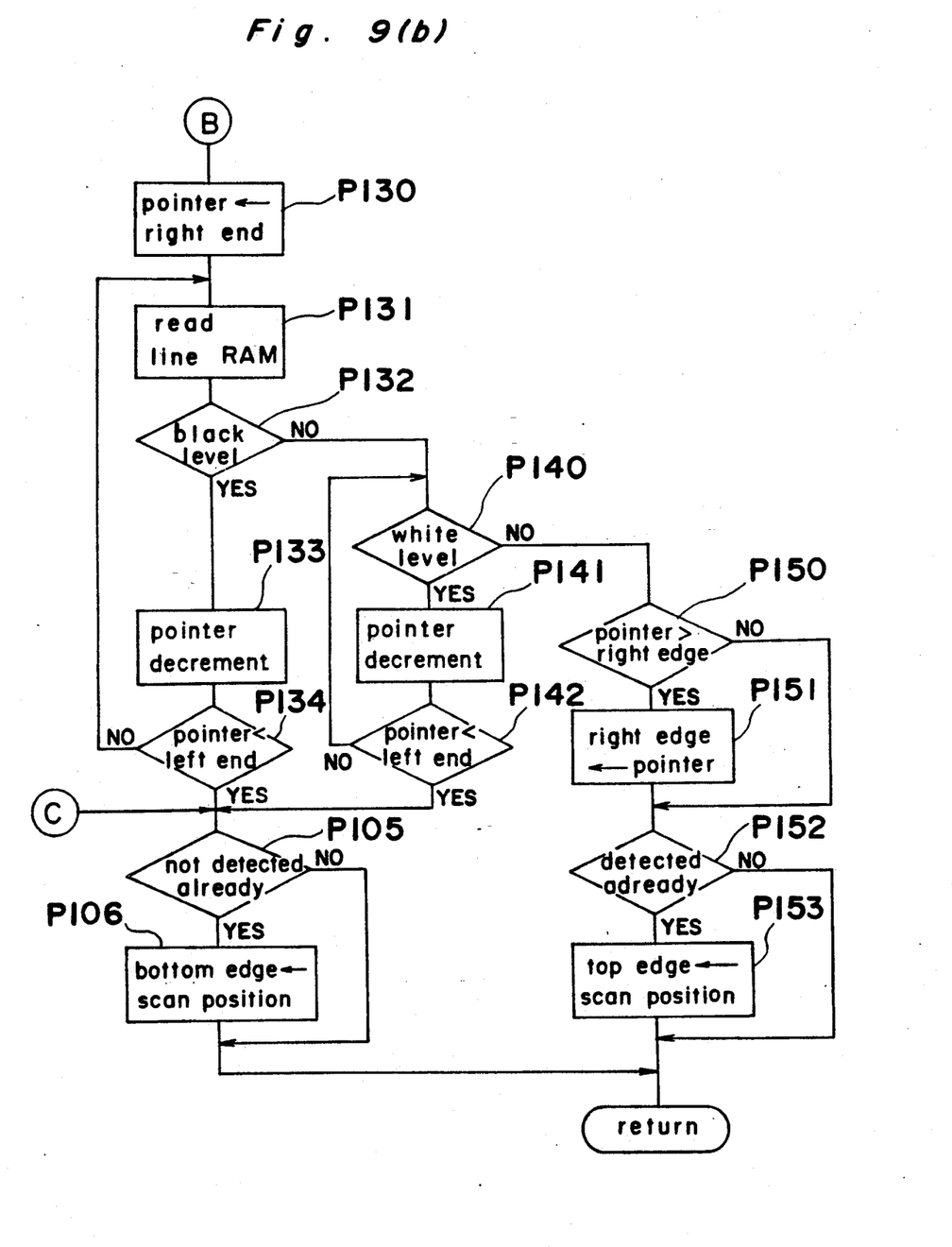

FIGS. 9(a),(b) shows a flow of the detection of the image area by using the data stored in line RAM 50 in the subscan. The flow is repeated per each main scan at a subscan position.

First, a pointer for the read of the data of CCD 20 is located at the top position (left end position) (step P100). The left edge of the image and the right edge thereof are also set as the initial values, that is, the top and bottom positions of the pixel of CCD 20.

Next, the data of the pixel which is designated by the pointer is read (step P101), and it is decided whether the data is the black level or not (step P102). If the data is the black level, no image is detected so that the pointer is renewed to the next position to the right (step P103). Then, it is decided whether the pointer exceeds the right end position (step P104). If the decision is no, the program returns to step P101. If the decision is yes, no image is contained in the main scan. Then, it is decided whether any image is detected in the previous scans or not (step P105). If the previous scans detect any image, the present scan position is determined as the bottom edge (step P106). If the decision is no, the program returns to the main program.

If it is decided in step P102 that the data is not the black level, it is decided next whether the data is the white level or not (step P110). If the data is the white level, the pointer is renewed to the next position to the right (step P111). Then, it is decided whether the pointer exceeds the right end position (step P112), and if the decision is no, the program returns to step P110. If the pointer exceeds the right end position, the program goes to step P105. This process is repeated till the black level is detected.

If it is decided in step P110 that the data is not the white level but the black level, it is decided next whether the pointer is smaller than the left edge of the image determined in previous scans (step P120). If the pointer is smaller than the left edge, the left edge is renewed as the present position of the pointer, that is, the position that the black level is detected again. Thus, the left edge of the image is detected. If the decision is no in step P120, the program goes to step P130 in order to detect the right edge.

First, the pointer is located at the bottom end (the right end position) of the pixel in CCD 20 (step P130), and the data of the pixel is read (step P131). Then, it is decided whether the data is the black level or not (step P132). If the data is the black level, no image is detected so that the pointer is renewed to the next position to the left (step P133). Then, it is decided whether the pointer exceeds the left end position (step P134). If the decision is no, the program returns to step P131. If the decision is yes, no image is contained in the main scan. Then, it is decided whether an image is detected in the previous scans or not (step P105). If the previous scans detect an image, the present scan position is determined as the bottom edge (step P106). If the decision is no, the program returns to the main program.

If it is decided in step P132 that the data is not the black level, it is decided next whether the data is the white level or not (step P140). If the data is the white level, the pointer is renewed to the next position to the left (step P141). Then, it is decided whether the pointer exceeds the left end position (step P142), and if the decision is no, the program returns to step P140. If the pointer exceeds the left end position, the program goes to step P105. This process is repeated until the black level is detected.

If it is decided in step P140 that the data is not the white level but the black level, it is decided next whether the pointer is smaller than the right edge of the image determined in the previous scans (step P150). If the pointer is smaller than the right edge, the right edge is renewed as the present position of the pointer, that is, the position that the black level is detected again. Thus, the right edge of the image is detected. If the decision is no in step P150, no image is contained in the main scan, and the program goes to P152. Then, it is decided whether an image is detected in the previous scans or not (step P152). If an image is detected first, the present scan position is determined as the top edge (step P153). If the decision is no, the program returns to the main program.

Thus, the top edge of a document region can be detected on a subscan across a black pattern drawn on a pattern plate, with reference to a point where the detected level of density changes to the white level again.

Therefore, a document-top-edge-switch used in a prior art image reader is not required. Further, the precise location of a document scale may be flexible whereas the location of a pattern plate should be correct.

(f) level control

Figure 10:
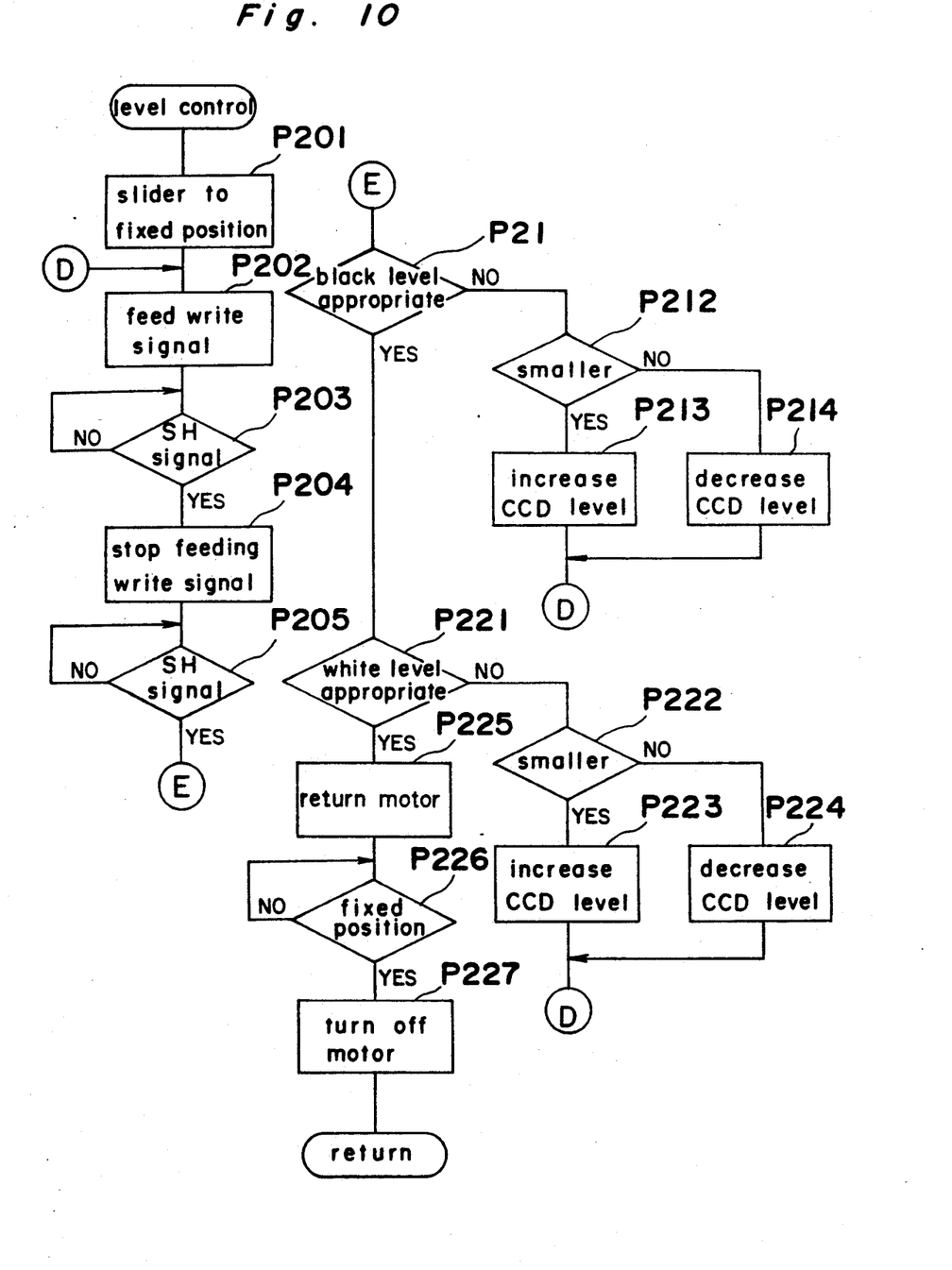
FIG. 10 is a flowchart of the level control.

FIG. 10 shows a flow of the control of the black and white levels of the density. First, the slider is moved to a position where the one-dimensional CCD 20 detects the light reflected from the black pattern 7c of the pattern plate 7 (step P201). The write signal of line RAM 50 is turned on (step P202), and the signals of CCD 20 are written in line RAM 50. After an SH signal is received from the clock generator 40 (step P203), the write signal is turned off (step P204), and the next SH signal is waited (step P205).

Next, CPU 42 reads the black level of a pixel at a predetermined position of line RAM 50 which corresponds to the black pattern 7c, and it is decided whether the black level is appropriate or not (step P211). If the decision is yes, the program goes to step P221.

If the decision is no, it is decided next whether the black level is smaller than the appropriate level or not (step P212). Then, the CCD level signal which CPU 42 sends to the digital-to-analog converter 76 is increased or decreased by a predetermined amount according to whether the black level is smaller or larger than the appropriate level (step P213, P214), and the program returns to step P202. This procedure is repeated until the black level becomes appropriate.

After the black level becomes appropriate, CPU 42 reads the white level of a pixel at another predetermined position of line RAM 50 which corresponds to the white part 7e of the pattern plate 7, and decides whether the white level is appropriate or not (step P221). If the white level is not appropriate, it is decided next whether the white level is smaller than an appropriate level or not (step P222). Then, the CCD level signal sent by CPU 42 is increased or decreased by a predetermined amount according to whether the white level is smaller or larger than the appropriate level (step P223, P224), and the program returns to step P202. This procedure is repeated until both black and white levels become appropriate.

After both white and black levels become appropriate, the motor of the slider is turned on in the reverse direction so as to move to the fixed position (step P225). When the slider returns at the fixed position (step P226), the motor is stopped (step P227).

Thus, the output level of image signal can be corrected because both white and black levels are corrected. Further, the output level of image signal is correct even if the temperature of the image sensor changes because the level is controlled per each scan.

As mentioned above, the black and white levels are controlled according to the densities of the black zone 7b and the white zone 7e, respectively. Such level control may be performed at the same time of the detection of the top edge 7f of the pattern plate 7. That is, the black level is controlled during the scan of the black zone 7c, and the white level is controlled during the scan of the white zone 7e.

The preferred embodiments described herein are illustrative and not restrictive, the scope of the invention being indicated by the appended claims and all variations which come within the meanings of the claims are intended to be embraced herein.

What is claimed is:

1. A scan apparatus, comprising:
   a platen on which a document can be placed;
   criterion member means providing a reference boundary for determining a margin for a copied image, said boundary formed of at least one black zone and at least one white zone positioned successively in the subscan direction, said criterion member means being arranged adjacent the platen in alignment in the subscan direction with a location on the platen on which the document can be placed and on the side of the platen from which a subscan is started;
   means for detecting a linear optical image of the document to obtain a density distribution of a linear optical image;
   means for scanning the criterion member means and a document in the subscan direction, said means including means for illuminating a document placed on a document area of the platen and the criterion member; and
   means for initiating a time delay before starting a scan of the document on the platen, said means being connected to the means for detecting a linear optical image so as to detect said boundary on the criterion member means and initiating the time delay at the time at which the boundary is detected.

2. A scan apparatus according to claim 1, wherein said means for initiating a time delay gives a signal when a predetermined time interval has elapsed from the time at which the boundary was detected said predetermined time interval being set equal to a time interval necessary for the means for scanning to move from the boundary to an edge of the platen.

3. A scan apparatus according to claim 1, wherein said criterion member means has one black zone and one white zone arranged in the order of black and white when seen in the direction of the sub-scan.

4. A scan apparatus according to claim 1, wherein said criterion member means has two white zones and one black zone arranged in the order of white, black and white in the direction of the sub-scan.

5. A scan apparatus according to claim 1, further comprising controlling means for receiving an output signal of means for detecting a linear optical image and simultaneously correcting said output signal according to density signals detected with respect to the black and white zones respectively.

6. A scan apparatus, comprising:
   a platen on which a document can be placed;
   a charge member having at least one black and at least one white zones which is arranged adjacent the platen on the side from which a subscan is started;

means for scanning a document on the platen and the chart member;

means for sensing a linear optical image of the document which gives output signals of various levels according to a density distribution of the image; and controlling means for receiving the output signals of the sensing means and simultaneously controlling said output signals according to density signals of each of said at least one black and at least one white zone obtained upon scanning the chart member.

7. An scan apparatus according to claim 6, wherein said sensing means includes a photo-sensing device, an amplifier for amplifying the difference between the level of the detected image signal and a standard signal and an analog-to-digital converter for converting the output signal of the amplifier to a digital value.

8. An scan apparatus according to claim 7, wherein said means for controlling the output level controls the level of the standard signal to be given to the amplifier according to the detected density of the black zone of the chart member.

9. An scan apparatus according to claim 7, wherein said means for controlling a output level controls the scale of the analog-to-digital conversion according to the detected density of the white zone of the chart member.

10. An scan apparatus according to claim 9, wherein said means for controlling the level supplies ananalog voltage for generating a reference signal for the scale to the analog-digital converter.

11. A scan apparatus according to claim 1, further comprising a means for conducting shading correction by a density signal generated according to said at least one white zone as said at least one white zone is detected by said means for detecting a linear optical image.

12. A scan apparatus comprising:

a platen on which a document can be placed;

a criterion member on which at least one black zone and at least one white zone are formed successively in the subscan direction, said criterion member being arranged adjacent the platen in alignment in the subscan direction with a location on the platen on which the document can be placed and on the side of the platen from which a subscan is started;

means for detecting a linear optical image of the document to obtain a density distribution of a linear optical image;

means for scanning the criterion member and a document in the subscan direction, said means including means for illuminating a document placed on a document area of the platen and the criterion member;

means for initiating a time delay before starting a scan of the document on the platen, said means being connected to the means for detecting a linear optical image so as to detect a boundary on the criterion member between the black and white zones and initiating the time delay at the time at which the boundary is detected; and means for conducting shading correction by a density signal generated according to said at least one white zone as said at least one white zone is detected by said means for detecting a linear optical image, wherein said means for shading correction is adapted to conduct said shading correction before a time delay is initiated by said means for initiating a time delay.

13. A scan apparatus according to claim 6, further comprising a means for conducting shading correction by a density signal generated according to a white shading correction zone that is detected by said means for detecting a linear optical image, said white shading correction zone having a width substantially equal to said platen.

14. An image reader for reading an image of a document and for sending digital data corresponding to the image having been read, comprising:

a platen on which a document can be placed;

a criterion member on which at least one black zone and one white zone are formed, said criterion member being arranged adjacent the platen on the side from which a subscan is started;

a linear sensor array for sensing a linear optical image to obtain a density distribution of the linear optical image;

means for scanning the criterion member and a document by the linear sensor array;

an amplifier for amplifying the difference between a level of an output signal of said linear sensor array and a standard level signal;

an analog-to-digital converter for converting an analog output of said amplifier to a digital data;

a black level correction means for correcting a density level signal for a black image by correcting an output of said amplifier according to an output signal of said linear sensor array obtained during the sensing of said black zone by said linear sensor array; and a white level correction means for correcting a density level signal for a white image by correcting an output of said analog-to-digital converter according to an output signal of said linear sensor array obtained during the sensing of said white zone by said linear sensor array.

15. An image reader according to claim 14, wherein said black level correction means is adapted to correct said output of said amplifier by correcting a standard level signal such that a difference between said output signal of said linear sensor array and said standard signal is substantially zero.

16. An image reader according to claim 14, further comprising a means for conducting shading correction by a density signal generated according to a white shading correction zone that is detected by said means for detecting a linear optical image, said white shading correction zone having a width substantially equal to said platen.

* * * * *